(12) United States Patent
Asaoka et al.

(10) Patent No.: US 12,358,186 B2
(45) Date of Patent: Jul. 15, 2025

(54) FLASH DRYING APPARATUS AND METHOD OF PRODUCING PARTICLES

(71) Applicant: CANON KABUSHIKI KAISHA, Tokyo (JP)

(72) Inventors: Junya Asaoka, Shizuoka (JP); Takeshi Tsujino, Shizuoka (JP); Koki Inoue, Shizuoka (JP); Shota Amano, Kanagawa (JP); Masahiro Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 17/877,674

(22) Filed: Jul. 29, 2022

(65) Prior Publication Data

US 2023/0053323 A1 Feb. 16, 2023

(30) Foreign Application Priority Data

Aug. 2, 2021 (JP) .................. 2021-126531

(51) Int. Cl.
  *B29B 13/06* (2006.01)
  *B29B 9/16* (2006.01)
  *F26B 17/10* (2006.01)
  *F26B 21/02* (2006.01)

(52) U.S. Cl.
  CPC .............. *B29B 13/065* (2013.01); *B29B 9/16* (2013.01); *F26B 17/105* (2013.01); *F26B 17/107* (2013.01); *F26B 21/02* (2013.01); *B29B 2009/161* (2013.01)

(58) Field of Classification Search
  CPC ... B29B 13/065; B29B 9/16; B29B 2009/161; F26B 17/105; F26B 17/107; F26B 21/02
  See application file for complete search history.

(56) References Cited

U.S. PATENT DOCUMENTS

| 2,285,508 | A | * | 6/1942 | Goss | ..................... F26B 17/105 432/16 |
| 3,329,418 | A | * | 7/1967 | Stephanoff | ............ F26B 17/105 34/594 |
| 3,339,286 | A | * | 9/1967 | Stephanoff | ............ F26B 17/105 34/372 |

(Continued)

FOREIGN PATENT DOCUMENTS

| JP | H03287173 A | 12/1991 |
| JP | 2005030621 A | 2/2005 |

(Continued)

*Primary Examiner* — Edelmira Bosques
*Assistant Examiner* — Bao D Nguyen
(74) *Attorney, Agent, or Firm* — Canon U.S.A., Inc. I.P. Division

(57) ABSTRACT

A loop-type flash drying apparatus configured to dry an object to be treated with a gas by supplying the object into a gas stream circulating in a loop-type drying pipe, wherein the loop-type flash drying apparatus includes: (i) a loop-type drying pipe; (ii) a feeding port configured to feed an object to be treated into the drying pipe; (iii) a second blowing port configured to blow a gas into the drying pipe; (iv) a discharge port configured to discharge the object from the drying pipe; (v) a discharge region formed by the drying pipe and the discharge port; and (vi) a first blowing port through which a gas for accelerating a gas flowing in the discharge region is linearly blown toward the discharge region.

2 Claims, 13 Drawing Sheets

(56) References Cited

U.S. PATENT DOCUMENTS

| | | | | |
|---|---|---|---|---|
| 3,403,451 A * | 10/1968 | Stephanoff | ............ | F26B 17/105 34/371 |
| 3,667,131 A * | 6/1972 | Stephanoff | ............ | F26B 17/105 34/373 |
| 3,699,662 A * | 10/1972 | Stephanoff | ............ | F26B 17/105 34/362 |
| 3,802,089 A * | 4/1974 | Stephanoff | .............. | C02F 11/13 34/58 |
| 3,814,316 A * | 6/1974 | Stephanoff | ............... | B01D 1/20 34/361 |
| 3,922,796 A * | 12/1975 | Stephanoff | ............ | F26B 17/105 432/2 |
| 3,945,130 A * | 3/1976 | Stephanoff | ............ | F26B 17/105 34/371 |
| 3,958,342 A * | 5/1976 | Stephanoff | ............ | F26B 17/105 34/585 |
| 3,974,574 A * | 8/1976 | Van Vliet | ............... | F26B 17/105 34/585 |
| 4,214,375 A * | 7/1980 | Albus | ................... | F26B 17/105 34/317 |
| 4,226,027 A * | 10/1980 | Albus | ................... | F26B 17/105 34/580 |
| 4,335,663 A * | 6/1982 | Terrell | ................. | F23C 99/005 110/215 |
| 4,489,503 A * | 12/1984 | Browne | ................ | F26B 17/105 34/368 |
| 4,490,924 A * | 1/1985 | Lambert | ............... | F26B 23/002 34/514 |
| 5,658,142 A * | 8/1997 | Kitchen | ................... | F26B 1/00 432/67 |
| 6,256,902 B1 * | 7/2001 | Flaherty | ................ | F26B 17/101 34/387 |
| 6,748,671 B1 * | 6/2004 | Vrbanac | .................... | C08J 3/12 34/356 |
| 6,769,199 B2 * | 8/2004 | Vrbanac | .................... | C08J 3/12 34/443 |
| 6,782,637 B2 * | 8/2004 | Yancey | ................. | C04B 18/241 34/221 |
| 6,862,819 B2 * | 3/2005 | Vrbanac | ................. | D21C 9/007 34/224 |
| 6,918,991 B2 * | 7/2005 | Chickering, III | .... | A61K 9/1688 159/48.1 |
| 7,018,508 B2 * | 3/2006 | Yancey | ................. | D21C 9/001 162/100 |
| 2002/0031714 A1 * | 3/2002 | Fumita | ................. | G03G 9/0815 430/137.17 |
| 2004/0049941 A1 * | 3/2004 | Malachowski | ........ | F26B 17/105 34/576 |
| 2010/0212180 A1 * | 8/2010 | Munter | ................. | F26B 23/028 34/140 |
| 2016/0327338 A1 * | 11/2016 | Jia | ............................ | F26B 21/02 |
| 2023/0143655 A1 * | 5/2023 | Tatekawa | ............... | F26B 17/107 526/318.45 |
| 2024/0131580 A1 * | 4/2024 | Tokusada | ................. | B22F 9/18 |

FOREIGN PATENT DOCUMENTS

| | | |
|---|---|---|
| JP | 2006221040 A | 8/2006 |
| JP | 2016180541 A | 10/2016 |

* cited by examiner

FLASH DRYING APPARATUS AND METHOD OF PRODUCING PARTICLES

BACKGROUND OF THE INVENTION

Field of the Invention

The present disclosure relates to a loop-type flash drying apparatus configured to dry wet powder. The present disclosure also relates to a method of producing particles through use of the loop-type flash drying apparatus according to the present disclosure, and more particularly, to a method of producing toner particles through use of the loop-type flash drying apparatus according to the present disclosure.

Description of the Related Art

A flash dryer is widely used in industry as a unit configured to dry wet powder. Drying equipment including the flash dryer is widely adopted in the fields of chemical industry, food industry, and the like, and is used for drying of powder of a synthetic resin, an inorganic salt, corn starch, a fiber, or the like.

The flash dryer is configured to dry an object to be treated by bringing a gas serving as a heat medium and the object into contact with each other. Accordingly, excessive heat is transferred to the object, which is also liable to cause a harmful effect, such as the object fusing to the apparatus, or the object being changed by heat, leading to a reduction in performance thereof.

In Japanese Patent No. 3812904, with a view to suppressing such harmful effect, there is a proposal of a flash drying apparatus in which a flash dryer is provided with a temperature-holding unit to control heat to be applied to an object to be treated.

Of the flash dryers, a loop-type flash dryer is suitably used because the dried object is appropriately discharged from the drying pipe, and hence is exposed to the drying gas for a shorter period of time after drying than in other flash dryers, thereby being less liable to have excessive heat applied thereto. When the loop-type flash dryer is used, a temperature of the drying gas blown into the loop-type flash dryer may be reduced in order to reduce an influence of heat on the object. In addition, as another technique, there is also known a technique involving reducing a gas flow rate of the blown drying gas. However, those techniques each cause a reduction in quantity of heat supplied to the loop-type flash dryer, and hence reduce treatment capacity, thus having a disadvantage from the viewpoint of productivity.

In Japanese Patent Application Laid-Open No. 2006-221040, with a view to meeting such challenge, there is a proposal of a system in which, in order to set a temperature on a downstream side with respect to an upstream side in a conveying direction of an object to be treated in a loop-type flash dryer to an arbitrary temperature region, the downstream temperature is regulated by appropriately introducing a gas for temperature regulation.

However, in the technique as described in Japanese Patent Application Laid-Open No. 2006-221040, the temperature of a gas added upstream is forcibly changed by the gas blown downstream, and hence the quantity of heat of the drying gas is reduced as a result. Further, with a view to preventing the object to be treated from being deteriorated by heat, there is a proposal that a plurality of loop-type flash dryers be connected in tandem, but there is a disadvantage from the viewpoint of productivity in consideration of treatment capacity per loop-type flash dryer.

SUMMARY OF THE INVENTION

The present disclosure is directed to provide a loop-type flash drying apparatus capable of drying an object to be treated without reducing treatment capacity and without applying an excessive quantity of heat to the object. The present disclosure is also directed to provide a method of producing particles through use of the loop-type flash drying apparatus according to the present disclosure.

The present disclosure relates to a loop-type flash drying apparatus configured to dry an object to be treated with a gas by supplying the object into a gas stream circulating in a loop-type drying pipe, wherein the loop-type flash drying apparatus includes:
(i) a loop-type drying pipe;
(ii) a feeding port configured to feed an object to be treated into the drying pipe;
(iii) a second blowing port configured to blow a gas into the drying pipe;
(iv) a discharge port configured to discharge the object from the drying pipe;
(v) a discharge region formed by the drying pipe and the discharge port; and
(vi) a first blowing port through which a gas for accelerating a gas flowing in the discharge region is linearly blown toward the discharge region.

The present disclosure also relates to a method of producing particles including drying wet particles with the loop-type flash drying apparatus of the above-mentioned configuration.

Further features of the present disclosure will become apparent from the following description of exemplary embodiments with reference to the attached drawings.

DESCRIPTION OF THE EMBODIMENTS

Figure 1:
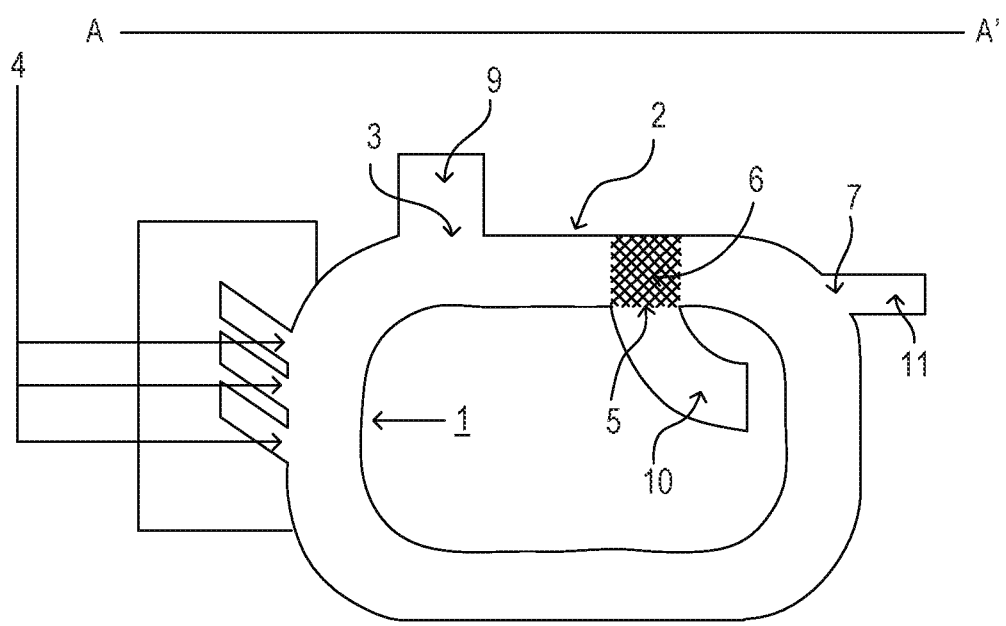
FIG. 1 is a schematic view for illustrating an example of a loop-type flash dryer that may be applied to a drying step of the present disclosure.

The present disclosure is described in detail below.

A loop-type flash drying apparatus of the present disclosure is a loop-type flash drying apparatus configured to dry an object to be treated with a gas by supplying the object into a gas stream circulating in a loop-type drying pipe, wherein the loop-type flash drying apparatus includes: (i) a loop-type drying pipe; (ii) a feeding port configured to feed an object to be treated into the drying pipe; (iii) a second blowing port configured to blow a gas into the drying pipe; (iv) a discharge port configured to discharge the object from the drying pipe; (v) a discharge region formed by the drying pipe and the discharge port; and (vi) a first blowing port through which a gas for accelerating a gas flowing in the discharge region is linearly blown toward the discharge region.

The object which is subjected to the loop-type flash drying apparatus of the present disclosure is wet particles or wet resin particles, and a more specific example thereof is wet toner particles produced by a polymerization method. A case in which the present disclosure is used for a method of producing a toner based on a suspension polymerization method is described.

The "suspension polymerization method" is a production method involving forming, in an aqueous medium, particles of a polymerizable monomer composition containing a polymerizable monomer and a colorant, and polymerizing the polymerizable monomer contained in the particles of the polymerizable monomer composition to provide toner particles.

A method of producing toner particles based on the suspension polymerization method is described below step by step.

(Polymerizable Monomer Composition-preparing Step)

A polymerizable monomer composition containing a polymerizable monomer and a colorant is prepared. The colorant may be dispersed in the polymerizable monomer with a medium stirring mill or the like in advance and then mixed with other components of the composition, or may be dispersed after all the other components of the composition have been mixed.

(Granulation Step)

The polymerizable monomer composition is charged into an aqueous medium containing an inorganic dispersion stabilizer, and is dispersed therein to be granulated, to thereby provide a polymerizable monomer composition dispersion liquid. The granulation step may be performed, for example, in a vertical stirring tank provided with a stirring machine having a high shear force. The stirring machine having a high shear force is not particularly limited, but for example, a commercially available one, such as High Shear Mixer (manufactured by IKA Corporation), T.K. Homomixer (manufactured by Tokushu Kika Kogyo Co., Ltd.), T.K. FILMIX (manufactured by Tokushu Kika Kogyo Co., Ltd.), or CLEARMIX (manufactured by M Technique Co., Ltd.), may be used.

Examples of the inorganic dispersion stabilizer include: carbonic acid salts, such as barium carbonate, calcium carbonate, and magnesium carbonate; phosphoric acid metal salts, such as aluminum phosphate, magnesium phosphate, calcium phosphate, barium phosphate, and zinc phosphate; sulfuric acid salts, such as barium sulfate and calcium sulfate; and metal hydroxides, such as calcium hydroxide, aluminum hydroxide, magnesium hydroxide, and ferric hydroxide. Those inorganic dispersion stabilizers may be used alone or in combination thereof. Those inorganic dispersion stabilizers each exhibit a function as a dispersion stabilizer by being present as poorly water-soluble inorganic fine particles in the aqueous medium.

(Reaction Step)

The polymerizable monomer in the polymerizable monomer composition dispersion liquid obtained as described above is polymerized to provide a dispersion liquid of toner particles. In the reaction step in the present disclosure, a general stirring tank capable of temperature regulation may be used.

The polymerization is performed at a temperature of 40° C. or more, generally from 50 to 90° C. The polymerization temperature may be constant all the time, but may be increased in the latter part of the polymerization step for the purpose of obtaining a desired molecular weight distribution.

As a stirring blade to be used for stirring, there may be used any stirring blade that is capable of allowing the polymerizable monomer composition dispersion liquid to be suspended without stagnating, and of keeping the temperature in the tank uniform. Examples of the stirring blade or a stirring unit include general stirring blades, such as a paddle blade, an inclined paddle blade, triple sweptback blades, a propeller blade, a disc turbine blade, a helical ribbon blade, and an anchor blade, and "FULLZONE" (manufactured by Shinko Pantec Co., Ltd.), "TWINSTIR" (manufactured by Shinko Pantec Co., Ltd.), "MAXBLEND" (manufactured by Sumitomo Heavy Industries, Ltd.), "Super-Mix" (manufactured by Satake Multimix Corporation), and "Hi-F Mixer" (manufactured by Soken Chemical & Engineering Co., Ltd.).

(Washing Step and Solid-Liquid Separation Step)

The dispersion liquid of the toner particles is treated with an acid or an alkali for the purpose of removing the dispersion stabilizer adhering to the surfaces of the toner particles. After that, the polymer particles are separated from the liquid phase by a general solid-liquid separation method, and the toner particles are washed with water again in order to completely remove the acid or alkali and the dispersion stabilizer component dissolved therein. This washing step is repeated several times, and after sufficient washing has been performed, solid-liquid separation is performed again to provide wet toner particles.

(Drying Step)

The resultant wet toner particles are dried in order to remove water, the aqueous medium, and the like contained therein.

As a drying technique to be used for a general drying step, there are given various drying modes, such as vacuum drying, fluidized bed drying, and flash drying. However, in the present disclosure, a loop-type flash dryer is used because the loop-type flash dryer is capable of uniformly applying heat from a gas for drying, and satisfactorily separating dried toner particles and undried toner particles.

For example, a loop-type flash dryer illustrated in FIG. 1 may be used as the loop-type flash dryer, but the present disclosure is not limited to the loop-type flash dryer illustrated in FIG. 1.

A loop-type flash dryer 1 illustrated in FIG. 1 includes a loop-type drying pipe 2, and the drying pipe includes a feeding port 3 configured to feed wet toner particles, second blowing ports 4 configured to blow a gas, and a discharge port 5 configured to discharge dried toner particles. In addition, the drying pipe includes a first blowing port 7 configured to blow a gas for accelerating a gas flowing in a discharge region 6 (shaded portion) formed by the drying pipe and the discharge port.

Figure 11:
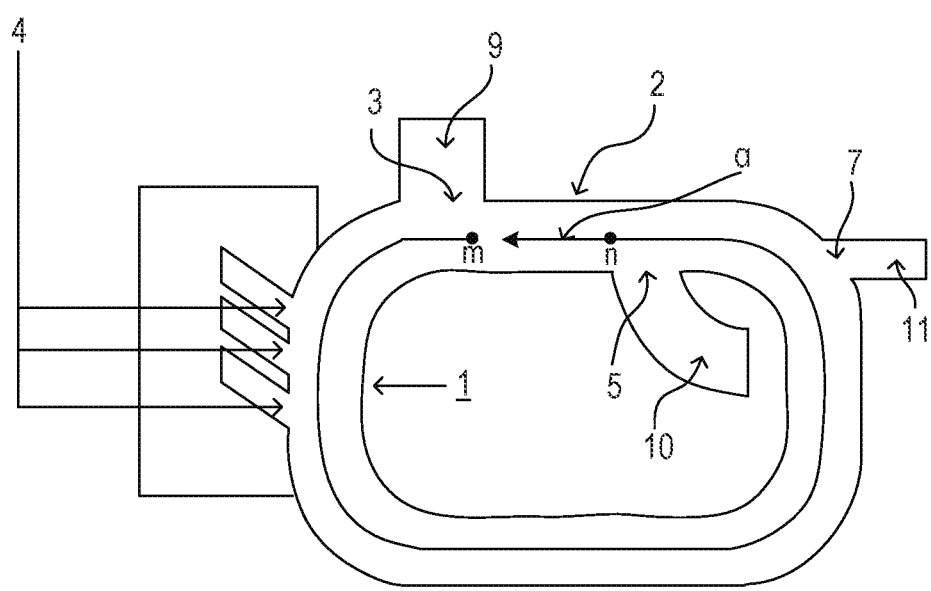
FIG. 11 is a schematic view for illustrating an example of a loop-type flash dryer that may be applied to the drying step of the present disclosure.

With reference to the circulation direction of the gas in the drying pipe, the feeding port 3, the second blowing ports 4, the first blowing port 7, and the discharge port 5 are preferably arranged in the stated order. The "circulation direction of the gas in the drying pipe" refers to a comprehensive travel direction of the gas flowing in the drying pipe of the loop-type flash dryer, and "α" in FIG. 11 corresponds to the circulation direction of the loop-type flash dryer illustrated in FIG. 1.

In the loop-type flash dryer, a gas is blown into the drying pipe to generate a gas stream circulating in the drying pipe. The object to be treated is continuously fed into the gas stream, and thus the object is dried. The discharge port 5 connected to the drying pipe 2 is configured to discharge part of the gas in the drying pipe and the dried object therein to the outside of the system of the drying pipe. A blower or the like may be connected to the secondary side of a discharge pipe 10 connected to the discharge port 5 to positively suck the gas in the drying pipe. A Coanda effect is generated near the discharge port, and hence part of the gas stream circulating in the drying pipe is discharged through the discharge port. At this time, the dried object reduced in mass through drying is discharged by riding on the flow of the gas stream that is discharged.

The drying pipe 2 is a tubular body in which wet toner particles are circulated by a gas stream. The shape of the drying pipe is not particularly limited, but the drying pipe is preferably configured to have a shape with a curvature at a portion at which the travel direction is changed.

The feeding port refers to an opening formed at a site at which a feeding pipe and the drying pipe are joined. The feeding port 3 configured to feed the toner particles into the drying pipe may be arranged at any position with respect to the drying pipe. The feeding port is more preferably arranged at such a position that the wet toner particles are fed in the direction of falling in a gravity direction into the drying pipe.

The second blowing ports 4 configured to blow a gas into the drying pipe may be arranged at any location, but are preferably arranged on the downstream side of the feeding port with reference to the circulation direction "α". Further, the second blowing ports 4 are preferably arranged at a portion at which the circulation direction of the gas flowing in the drying pipe has a vertically downward velocity component.

When the second blowing ports are arranged within this range, the gas can be blown through the second blowing ports to match the acceleration of the wet toner particles in the gravity direction, and hence a propulsive force by which the wet toner particles efficiently circulate in the drying pipe can be efficiently applied.

The discharge port refers to an opening formed at a site at which the discharge pipe and the drying pipe are joined. The discharge port 5 configured to discharge dried toner particles may be arranged at any location, but is preferably arranged on the inner peripheral side of the drying pipe 2 from the viewpoint of separation between the wet toner particles and the dried toner particles.

Further, it is more preferred that, with the uppermost stream part of the feeding port in the circulation direction "α" of the gas flowing in the drying pipe 2 as a starting point (point "m" in FIG. 11), a piping length "l" (m) of the drying pipe to the most downstream part of the discharge port (point "n" in FIG. 11) and a piping length L (m) of one loop of the drying pipe have a relationship of $0.7 \leq l/L < 0.9$. A case in which l/L is 0.7 or more is preferred for the following reason. A period of time from the entry of the wet toner particles into the drying pipe to reaching the discharge region is increased, and hence the ratio at which the fed wet toner particles have been dried in the discharge region can be increased, to thereby reduce the ratio of toner that circulates again beyond the discharge region. Accordingly, treatment capacity can be increased. In addition, a case in which l/L is 0.9 or less is preferred because the gas stream in the vicinity of the feeding port is not influenced by the gas stream that is discharged through the discharge port, and hence the wet toner particles can be prevented from being discharged in a reverse flow.

Figure 2:
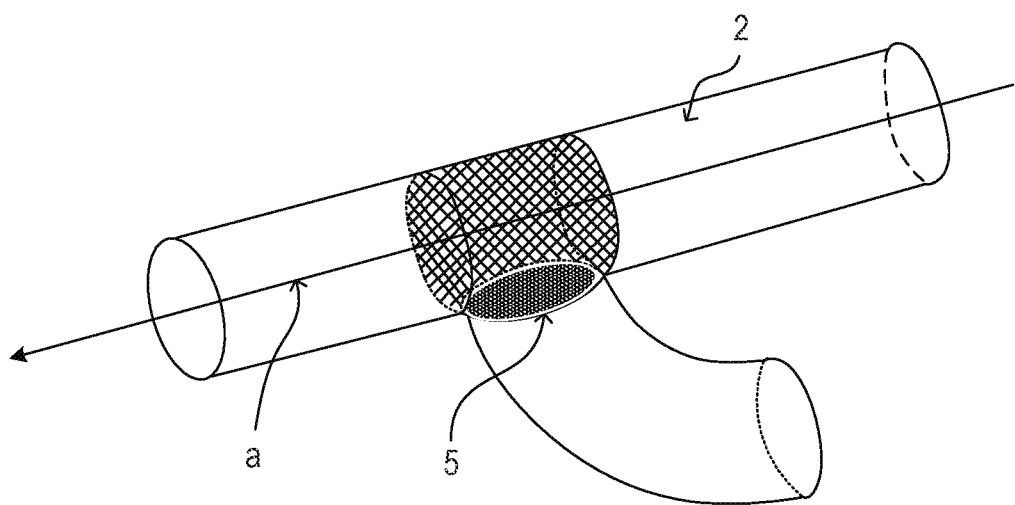
FIG. 2 is a schematic view for illustrating a discharge region of the loop-type flash dryer of FIG. 1.

The "discharge region" refers to a region (6 in FIG. 1) in the drying pipe where toner particles to be discharged through the discharge port are present. FIG. 2 is a schematic view for illustrating the discharge region of the loop-type flash dryer illustrated in FIG. 1. The discharge region refers to a space in the drying pipe made up of planes to each of which a straight line overlapping a circulation direction "a" of the gas stream circulating in the drying pipe is a perpendicular line, and each of which passes through the discharge port of the drying pipe.

When the drying pipe is configured to have a curvature, the discharge region is defined as a space in the drying pipe made up of planes to each of which a tangent line on a curve with the curvature at any point is a perpendicular line, and planes each passing through the discharge port of the drying pipe.

At the discharge port and in the discharge pipe and the discharge region, there occur a gas stream in the circulation direction in the drying pipe and a gas stream discharged into the discharge pipe. A Coanda effect occurring at this time allows the dried toner particles to be discharged from the drying pipe through the discharge port, and thus the dried toner particles can be obtained. The undried wet toner particles pass in the outer peripheral direction of the drying pipe through the action of stronger inertia as compared to the dried toner particles, and hence circulate in the drying pipe without being subjected to the influence of the Coanda effect. Thus, the wet toner particles and the dried toner particles are separated from each other.

The first blowing port refers to an opening formed at a site at which a first blowing pipe and the drying pipe are joined. The first blowing port is arranged to linearly blow a gas for accelerating a gas flowing in the discharge region toward the discharge region. The gas blown for acceleration is desirably such that, in the drying pipe, the discharge region is present on an extended line of its velocity component at the first blowing port in the discharge region. In this case, the gas flowing in the discharge region can be efficiently accelerated. This provides a gas stream sufficient for separating the dried toner particles and the wet toner particles in the discharge region, and hence is preferred.

The first blowing port 7 may be arranged at any location within the above-mentioned range. For example, like the loop-type flash dryer of FIG. 1 or that of FIG. 5, the first blowing port 7 may be arranged at such a position as to be horizontal to the discharge region on the upstream side of the discharge region 6 in the circulation direction of the gas in the drying pipe 2. Further, like a loop-type flash dryer of FIG. 4, the first blowing port 7 may be arranged at such a position that the circulation direction of the gas in the drying pipe 2 becomes vertically upward.

It is more preferred that a ratio (velocity component ratio) K (%) at which the discharge region is present on the extended line of the velocity component of the gas blown into the first blowing port be 20% or more. When the ratio is 20% or more, the separation between the wet toner particles and the dried toner particles in the discharge region can be more satisfactorily performed.

Figure 5:
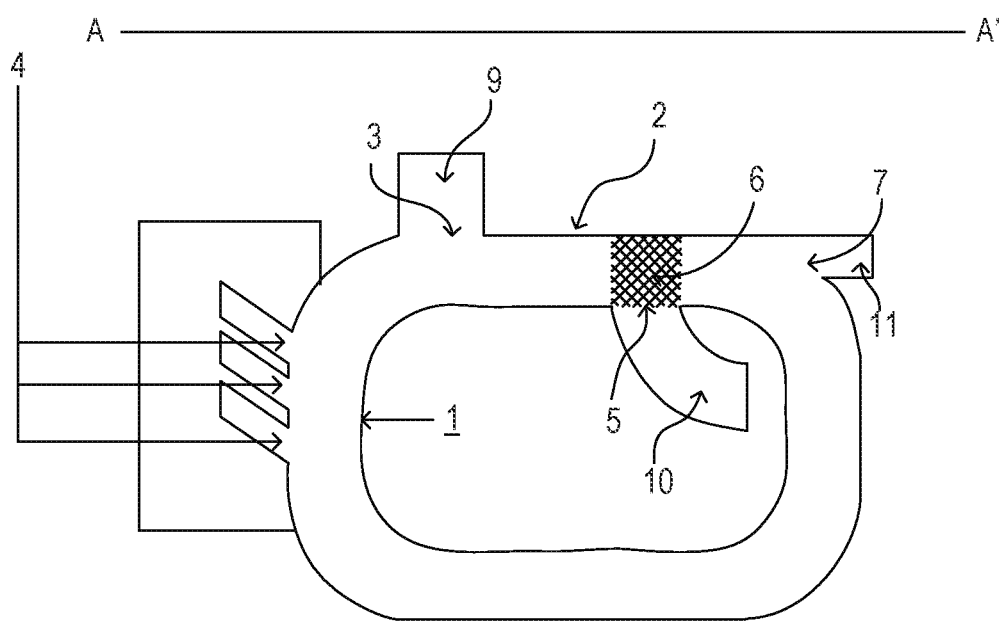
FIG. 5 is a schematic view for illustrating an example of a loop-type flash dryer that may be applied to the drying step of the present disclosure.
Figure 6:
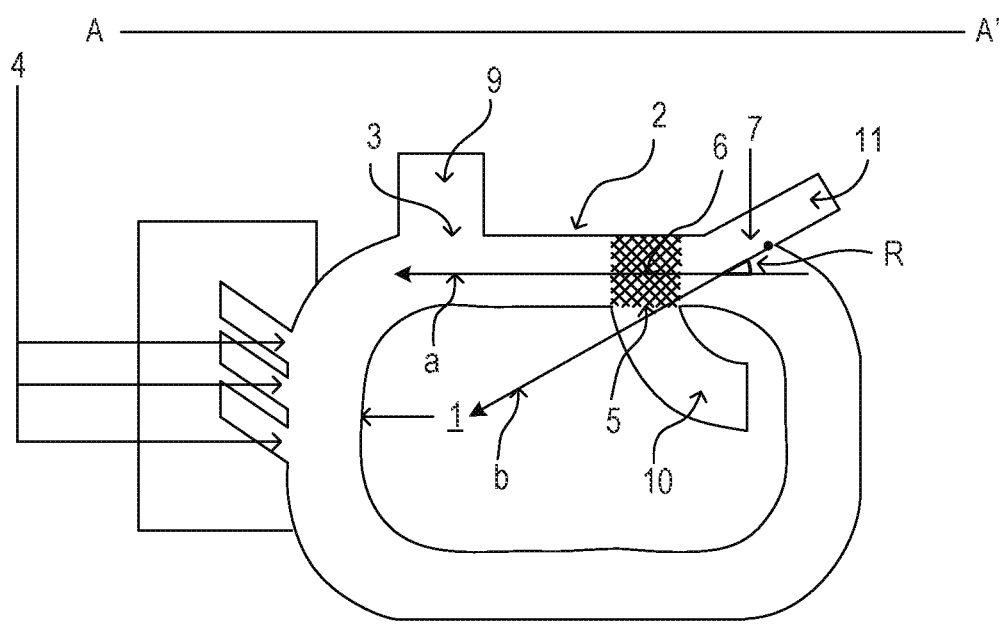
FIG. 6 is a schematic view for illustrating an example of a loop-type flash dryer that may be applied to the drying step of the present disclosure.

The first blowing port and the discharge port are more preferably arranged at positions connected by a straight line in the drying pipe (e.g., FIG. 1, FIG. 5, and FIG. 6). In the case of this range, the acceleration effect of the gas blown through the first blowing port on the gas flowing in the discharge region can be more efficiently provided.

When the first blowing port and the discharge port are arranged at positions connected by a straight line in the drying pipe, it is desired that an angle R (°) illustrated in FIG. 6 and formed between a velocity component "b" of the gas blown through the first blowing port 7 and the circulation direction "a" in the discharge region 6 be 0≤R≤30. When the angle R falls within this range, the gas stream in the discharge region is hardly disturbed, and hence the discharge of the dried toner particles through the Coanda effect is more satisfactorily performed. The angle R is measured with the upstream side of the circulation direction "a" being set to 0°.

The first blowing port is more preferably arranged on the outer peripheral side of the drying pipe. The first blowing port is still more preferably arranged at the outermost peripheral portion.

The cross-sectional area A ($m^2$) of the drying pipe and the area B ($m^2$) of the first blowing port preferably have a relationship of 0.10≤B/A≤0.60. The cross-sectional area of the drying pipe is the area of a surface formed by intersection of the drying pipe and a plane to which a straight line overlapping the circulation direction is a perpendicular line. A case in which B/A falls within this range is preferred because the acceleration effect in the discharge region brought by the gas blown through the first blowing port is increased. The inertia acting on the wet toner particles is increased, and hence the accuracy of separation between the wet toner particles and the dried toner particles to be discharged through the Coanda effect in the discharge region is further increased.

Figure 3:
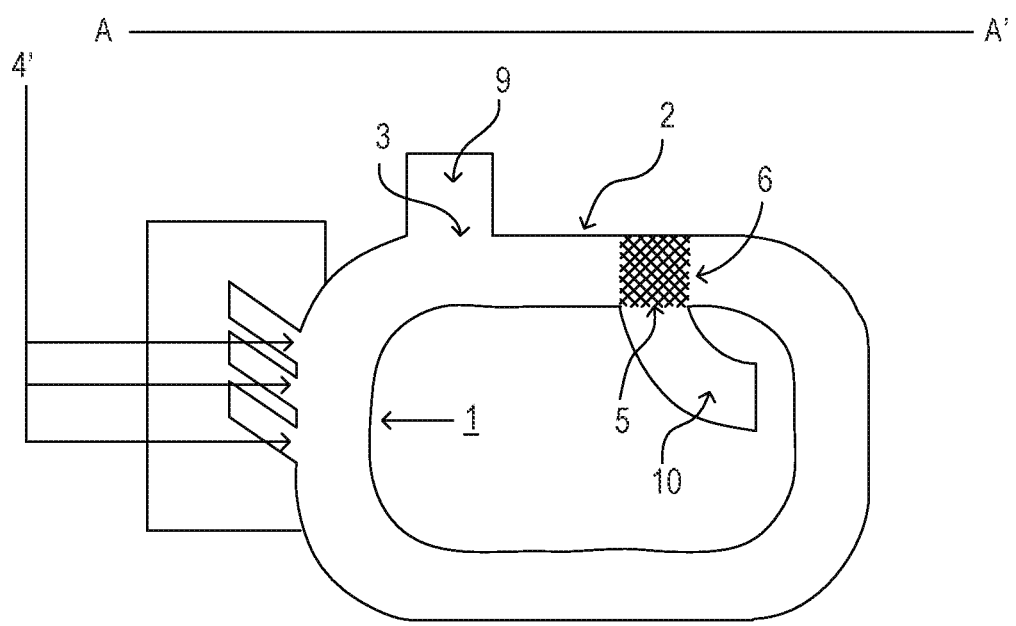
FIG. 3 is a schematic view for illustrating a discharge region of a loop-type flash dryer including no first blowing port, which was used in Comparative Examples.

In such a related-art loop-type flash dryer as illustrated in FIG. 3, a gas blown through blowing ports 4' is used to apply a quantity of heat required for drying, and to apply a propulsive force by which the wet toner particles circulate in the drying pipe 2. Accordingly, in the related-art loop-type flash dryer, the temperature of the gas to be blown through the blowing ports is set low in consideration of the harmful effect of heat on the object to be treated. In addition, when a quantity of heat sufficient for drying is applied in order to achieve a treatment amount commensurate with a production amount, the gas flow rate becomes excessive, and even after the wet toner particles have been dried by the gas blown through the blowing ports, some of the toner particles are exposed to collision with the wall surface of the pipe or the heat of the gas instead of being discharged. Meanwhile, when the gas flow rate is reduced in order to avoid such collision, the temperature of the blown gas needs to be increased, and hence drying proceeds instantly near the blowing ports, with the result that some of the toner particles are exposed to excessive heat before being discharged through the discharge port. Accordingly, there have been harmful effects, such as causing, for example, fusion between the toner particles and localization of a component contained in the toner particles.

When the gas flow rate and the temperature are both reduced in order to suppress those harmful effects, in the case where the supply amount of the wet toner particles is the same, the wet toner particles are discharged through the discharge port and are not sufficiently dried. In order to avoid this, the supply amount of the wet toner particles needs to be reduced, but this reduces treatment capacity and is not preferred from the viewpoint of productivity.

We have made extensive investigations, and as a result, have found that, when the loop-type flash dryer of the present disclosure is used for the production of resin particles or toner particles, the above-mentioned disadvantages are both solved, and the object to be treated can be dried without reducing treatment capacity and without applying an excessive quantity of heat to the object.

In the loop-type flash dryer of the present disclosure, it is also possible to impart a quantity of heat required for drying and a propulsive force for circulating the wet toner particles in the drying pipe to the gas blown through the first blowing port.

In addition, we have found that it is more preferred to perform the drying so that the total gas flow rate F (L/sec) of the gases supplied to the drying pipe and the gas flow rate S (L/sec) of the gas supplied through the first blowing port have a relationship of 0.10≤S/F≤0.85. A case in which S/F falls within this range is preferred because the wet toner particles can be dried while a balance among a gas flow rate appropriate for circulation in the drying pipe, the quantity of heat required for drying, and a gas flow rate for expressing a sufficient Coanda effect in the discharge region is maintained.

In addition, the gas flow rate F (L/sec) of the gases supplied to the drying pipe and the gas flow rate V (L/sec) of the gas discharged through the discharge port preferably have a relationship of 1.0≤V/F≤1.3. The gas flow rate of the gases blown into the drying pipe refers to the total amount of the gases supplied through the second blowing ports and the first blowing port. When the gas flow rate of the gas discharged through the discharge port is larger than the gas flow rate of the gases blown into the drying pipe, a gas drawn into the feeding port or the like occurs, but this gas is not included in the gas flow rate V. A case in which V/F falls within this range is more preferred because the gases supplied through the second blowing ports and the first blowing port facilitate the control of a balance among drying, circulation, and discharge.

Further, it is more preferred that the temperature of the gas supplied through the first blowing port be 30 to 80° C. The gas supplied through the first blowing port mainly serves to achieve a gas flow speed for sufficiently expressing a Coanda effect in the discharge region, and to complement the quantity of heat required for the drying of the wet toner particles. Toner particles dried by the gas blown through the second blowing ports are present near where the first blowing port is arranged, and hence it is important that the toner particles dried by the temperature of the gas blown through the first blowing port be prevented from being damaged by heat. A case in which the temperature falls within this range is more preferred because both of the gas flow speed for expressing a Coanda effect in the discharge region and the application of the quantity of heat for drying can be easily achieved, and hence toner particles dried in a suitable state are obtained.

Further, from the above-mentioned viewpoint, the gas supplied through the first blowing port more preferably has a temperature (° C.) equal to or lower than the Tg (° C.) of the toner particles.

(Classification Step)

After the drying, classification is performed with an air classier or the like in order to achieve a required particle size distribution, and thus desired toner particles are obtained.

(External Addition Step)

External additives and the toner particles are mixed for the purpose of imparting various characteristics to the toner particles, and thus a toner may be obtained.

As a binder resin to be used for toner, there may be given a styrene-acrylic copolymer. The styrene-acrylic copolymer is a copolymer of a styrene-based monomer and an acrylic monomer (acrylic acid or methacrylic acid and an alkyl ester thereof).

In this case, the styrene-acrylic copolymer may be contained in the binder resin in a state of being formed only of the styrene-acrylic copolymer, or may be contained in the binder resin in a state of being a block copolymer or a graft copolymer with another polymer or the like, or a mixture thereof.

In addition, the content of the styrene-acrylic polymer in the binder resin is 50% by mass or more, preferably 80% by mass to 100% by mass.

When the binder resin contains the styrene-acrylic copolymer, the development characteristic and durability of the toner are improved.

Other than the styrene-acrylic copolymer, a known resin or polymer to be used for toner may be used as the binder resin.

Examples of the styrene-based monomer include the following monomers: styrene, α-methylstyrene, β-methylstyrene, o-methylstyrene, m-methylstyrene, p-methylstyrene, 2,4-dimethylstyrene, and divinylbenzene.

Those styrene-based monomers may be used alone, or two or more kinds selected from those styrene-based monomers may be used in combination.

Examples of the acrylic monomer include the following monomers: acrylic acid alkyl esters, such as methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, n-decyl acrylate, and n-dodecyl acrylate;

methacrylic acid alkyl esters, such as methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, n-decyl methacrylate, and n-dodecyl methacrylate;

acrylic acid diesters, such as diethylene glycol diacrylate, triethylene glycol diacrylate, tetraethylene glycol diacrylate, polyethylene glycol diacrylate, and 1,6-hexanediol diacrylate; and acrylic acid and methacrylic acid.

Those acrylic monomers may be used alone, or two or more kinds selected from those acrylic monomers may be used in combination.

The glass transition temperature (Tg) of the binder resin may be caused to fall within a desired range by adjusting the polymerization ratio of the styrene-based monomer and the acrylic monomer. Specifically, the polymerization ratio of the styrene-based monomer and the acrylic monomer (styrene-based monomer:acrylic monomer) is preferably from 65:35 to 100:0, more preferably from 70:30 to 85:15 on a mass basis.

The glass transition temperature (Tg) of the binder resin is preferably 25 to 65° C.

Any of various polymerization initiators, such as a peroxide-based polymerization initiator and an azo-based polymerization initiator, may be used as a polymerization initiator to be used at the time of the production of the toner particles.

As an organic peroxide-based polymerization initiator, there are given a peroxyester, a peroxydicarbonate, a dialkyl peroxide, a peroxyketal, a ketone peroxide, a hydroperoxide, and a diacyl peroxide.

Specific examples of the organic peroxide-based polymerization initiator include:

peroxyesters, such as t-butyl peroxyacetate, t-butyl peroxypivalate, t-butyl peroxyisobutyrate, t-hexyl peroxyacetate, t-hexyl peroxypivalate, t-hexyl peroxyisobutyrate, t-butyl peroxy isopropyl monocarbonate, and t-butyl peroxy 2-ethylhexyl monocarbonate;

diacyl peroxides such as benzoyl peroxide; peroxydicarbonates such as diisopropyl peroxydicarbonate; peroxyketals such as 1,1-di-t-hexylperoxycyclohexane; dialkyl peroxides such as di-t-butyl peroxide; and as well, t-butyl peroxy allyl monocarbonate.

As an inorganic peroxide-based polymerization initiator, there are given a persulfuric acid salt and hydrogen peroxide.

In addition, examples of the azo-based polymerization initiator include 2,2'-Azobis(2,4-dimethylvaleronitrile), 2,2'-azobisisobutyronitrile, 1,1'-Azobis(cyclohexane-1-carbonitrile), 2,2'-Azobis-4-methoxy-2,4-dimethylvaleronitrile, azobisisobutyronitrile, and dimethyl-2,2'-Azobis(2-methylpropionate).

As required, two or more kinds of those polymerization initiators may be used at the same time.

The usage amount of the polymerization initiator is preferably 0.10 part by mass to 20.0 parts by mass with respect to 100.0 parts by mass of the polymerizable monomers.

The toner particles may each also contain a polar resin.

An example of the polar resin is a polyester-based resin. With use of the polyester-based resin as the polar resin, the lubricity of the resin itself can be expected when the resin is localized at the surface of each of the toner particles to form a shell.

An example of the polyester-based resin is a condensation polymerization product of an alcohol monomer and a carboxylic acid monomer.

Examples of the alcohol monomer include the following monomers:

alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl) propane, polyoxypropylene(2.0)-polyoxyethylene (2.0)-2,2-bis(4-hydroxyphenyl)propane, and polyoxypropylene(6)-2,2-bis(4-hydroxyphenyl)propane; and ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, sorbitol, 1,2,3,6-hexanetetrol, 1,4-sorbitan, pentaerythritol, dipentaerythritol, tripentaerythritol, 1,2,4- butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Meanwhile, examples of the carboxylic acid monomer include the following monomers:
aromatic dicarboxylic acids, such as phthalic acid, isophthalic acid, and terephthalic acid, or anhydrides thereof; alkyl dicarboxylic acids, such as succinic acid, adipic acid, sebacic acid, and azelaic acid, or anhydrides thereof; succinic acid substituted with an alkyl group or alkenyl group having 6 to 18 carbon atoms, or anhydrides thereof; and unsaturated dicarboxylic acids, such as fumaric acid, maleic acid, and citraconic acid, or anhydrides thereof.

In addition, other than the foregoing, the following monomers may be used: polyhydric alcohols, such as sorbit, sorbitan, and an oxyalkylene ether of a novolac-type phenol resin; and polyvalent carboxylic acids, such as trimellitic acid, pyromellitic acid, and benzophenonetetracarboxylic acid, and anhydrides thereof.

Of those, a condensation polymerization product of a bisphenol derivative represented by the following formula (I) and a divalent or higher carboxylic acid is preferred because of having a satisfactory charging characteristic. Examples of the divalent or higher carboxylic acid include fumaric acid, maleic acid, phthalic acid, terephthalic acid, trimellitic acid, pyromellitic acid, and acid anhydrides thereof, and lower alkyl esters thereof.

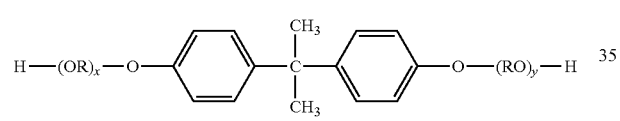

(I)

In the formula, R represents an ethylene group or a propylene group, "x" and "y" each represent an integer of 1 or more, and the average value of x+y is 2 to 10.

The content of the polar resin is preferably 1.0 part by mass to 20.0 parts by mass, more preferably 2.0 parts by mass to 10.0 parts by mass with respect to 100.0 parts by mass of the binder resin or the polymerizable monomers for producing the binder resin.

An organosilicon polymer to be used in the present disclosure preferably has a structure represented by the following formula (1).

 Formula (1)

In the formula (1), R represents an alkyl group having 1 to 4 carbon atoms. The organosilicon polymer having the structure of the formula (1) is preferably a condensation polymerization product of an organosilicon compound having a structure represented by the following formula (4).

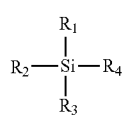

(4)

In the formula (4), $R_1$ represents a hydrocarbon group having 1 to 4 carbon atoms, and $R_2$, $R_3$, and $R_4$ each independently represent a halogen atom, a hydroxy group, an acetoxy group, or an alkoxy group.

From the viewpoint of improving affinity for the binder resin, $R_1$ represents preferably a hydrocarbon group having 1 to 4 carbon atoms, more preferably a methyl group.

$R_2$, $R_3$, and $R_4$ each independently represent a halogen atom, a hydroxy group, an acetoxy group, or an alkoxy group (hereinafter sometimes referred to as "reactive group"). Those reactive groups cause hydrolysis, addition polymerization, and condensation polymerization to form a crosslinked structure, and thus a toner excellent in member contamination resistance and development durability can be obtained. From the viewpoints of mild hydrolyzability at room temperature, and precipitation and coating properties on the surfaces of the toner particles, an alkoxy group having 1 to 3 carbon atoms is preferred, and a methoxy group or an ethoxy group is more preferred. In addition, the hydrolysis, addition polymerization, and condensation polymerization of $R_2$, $R_3$, and $R_4$ may be controlled based on a reaction temperature, a reaction time, a reaction solvent, and a pH.

In order to obtain the organosilicon polymer to be used in the present disclosure, it is appropriate that organosilicon compounds each having three reactive groups ($R_2$, $R_3$, and $R_4$) in one molecule excluding $R_1$ in the foregoing formula (4) (hereinafter sometimes referred to as "trifunctional silanes") be used alone or in combination thereof.

Examples of the organosilicon compound having the structure represented by the formula (4) include the following compounds:
trifunctional methylsilanes, such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, and methyldiethoxyhydroxysilane; and trifunctional silanes, such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, and butyltrihydroxysilane.

In addition, an organosilicon polymer obtained by using the following in combination with the organosilicon compound having the structure represented by the formula (4) may be used to such an extent that the effects of the present disclosure are not impaired: an organosilicon compound having four reactive groups in one molecule (tetrafunctional silane), an organosilicon compound having two reactive groups in one molecule (bifunctional silane), or an organosilicon compound having one reactive group (monofunctional silane). Examples thereof include the following:
dimethyldiethoxysilane, tetraethoxysilane, hexamethyldisilazane, 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, and trifunctional vinylsilanes, such as vinyltriisocyanatosilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane.

The toner particles may each contain a colorant. Examples of the colorant include various hitherto known dyes and pigments.

As a black colorant, there is given carbon black, a magnetic body, or a colorant toned black using the following yellow, magenta, and cyan colorants.

Examples of the yellow colorant include a monoazo compound, a disazo compound, a condensed azo compound, an isoindolinone compound, an anthraquinone compound, an azo metal complex, a methine compound, and an arylamide compound. A specific example thereof is C.I. Pigment Yellow 74, 93, 95, 109, 111, 128, 155, 174, 180, or 185.

Examples of the magenta colorant include a monoazo compound, a condensed azo compound, a diketopyrrolopyrrole compound, an anthraquinone compound, a quinacridone compound, a basic dye lake compound, a naphthol compound, a benzimidazolone compound, a thioindigo compound, and a perylene compound. Specific examples thereof include: C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, or 269; and C.I. Pigment Violet 19.

Examples of the cyan colorant include: a copper phthalocyanine compound and a derivative thereof; an anthraquinone compound; and a basic dye lake compound. A specific example thereof is C.I. Pigment Blue 1, 7, 15, 15:1, 15:2, 15:3, 15:4, 60, 62, or 66.

The toner may be used as a magnetic toner. In that case, it is appropriate that a magnetic body be incorporated into each of the toner particles. In this case, the magnetic body may also serve as the colorant. Examples of the magnetic body include: an iron oxide, such as magnetite, hematite, or ferrite; a metal, such as iron, cobalt, or nickel, or an alloy formed of any such metal and a metal, such as aluminum, cobalt, copper, lead, magnesium, tin, zinc, antimony, beryllium, bismuth, cadmium, calcium, manganese, selenium, titanium, tungsten, or vanadium; and mixtures thereof.

It is appropriate that the colorant be selected from the viewpoints of a hue angle, chroma, lightness, light fastness, OHP transparency, and dispersibility in the toner particles. The colorants may be used alone or as a mixture thereof, or may be used in a solid solution state.

The content of the colorant is preferably 1.0 part by mass to 20.0 parts by mass with respect to 100.0 parts by mass of the binder resin or the polymerizable monomers for producing the binder resin.

A wax to be used in the present disclosure is not particularly limited, and a known wax may be utilized, but the solubility parameter SPw of the wax is preferably 8.40 $(cal/cm^3)^{1/2}$ to 9.00 $(cal/cm^3)^{1/2}$.

From the viewpoint of compatibility with the styrene-acrylic copolymer contained in the binder resin, an ester wax that is a condensate of an alcohol component and a carboxylic acid component is suitably used as the wax.

In the present disclosure, the wax is not particularly limited as long as the wax satisfies the above-mentioned relationship, but the ester wax is preferred from the viewpoints of compatibility with the styrene-acrylic copolymer contained in the binder resin and releasability at the time of fixation. In addition, a monofunctional or bifunctional ester wax is preferred because of being more excellent in plasticity.

The monofunctional or bifunctional ester wax is, for example, an ester of a monohydric or dihydric linear saturated alcohol and a monovalent linear saturated fatty acid, or an ester of a monovalent or divalent linear saturated fatty acid and a monohydric linear saturated alcohol.

An alcohol having 6 to 24 carbon atoms is used as the monohydric linear saturated alcohol, and examples thereof may include, but not limited to, the following compounds: hexanol, heptanol, octanol, nonyl alcohol, decanol, lauryl alcohol, myristyl alcohol, palmityl alcohol, stearyl alcohol, and behenyl alcohol.

A diol having 6 to 24 carbon atoms is used as the dihydric linear saturated alcohol, and examples thereof may include, but not limited to, the following compounds: 1,6-hexanediol, 1,7-heptanediol, 1,8-octanediol, 1,9-nonanediol, 1,10-decanediol, 1,12-dodecanediol, 1,14-tetradecanediol, 1,16-hexadecanediol, 1,18-octadecanediol, 1,20-icosanediol, 1,22-docosanediol, and 1,24-tetracosanediol.

A monovalent linear saturated fatty acid having 8 to 24 carbon atoms is used, and examples thereof may include, but not limited to, the following compounds: hexanoic acid, octylic acid, nonylic acid, decanoic acid, dodecanoic acid, lauric acid, myristic acid, palmitic acid, stearic acid, and behenic acid.

A dicarboxylic acid having 8 to 24 carbon atoms is used as the divalent linear saturated fatty acid, and examples thereof may include, but not limited to, the following compounds: suberic acid, sebacic acid, dodecanedioic acid, tetradecanedioic acid, hexadecanedioic acid, octadecanedioic acid, icosanedioic acid, docosanedioic acid, and tetracosanedioic acid.

The wax is used at preferably 1.0 part by mass to 30.0 parts by mass with respect to 100.0 parts by mass of the binder resin.

The toner particles may each further contain a hydrocarbon wax other than the ester wax.

Examples of the hydrocarbon wax include: aliphatic hydrocarbon-based waxes, such as low-molecular-weight polyethylene, low-molecular-weight polypropylene, microcrystalline wax, paraffin wax, and Fischer-Tropsch wax; an oxidized product of an aliphatic hydrocarbon wax, such as oxidized polyethylene wax, or a block copolymer thereof; and a wax obtained by grafting a vinyl-based monomer, such as styrene or acrylic acid, to an aliphatic hydrocarbon wax.

The content of the hydrocarbon wax is preferably 0.5 part by mass to 5.0 parts by mass with respect to 100 parts by mass of the binder resin.

The melting point of each of the ester-based wax and the hydrocarbon wax is preferably 30 to 130° C., more preferably 60 to 100° C. When such thermal characteristic is exhibited, both of the low-temperature fixability and heat-resistant storage stability of the toner to be obtained can be easily secured.

The toner particles may each contain a charge control agent. Examples of the charge control agent include the following:

an organic metal compound, a chelate compound, a monoazo metal compound, an acetylacetone metal compound, a urea derivative, a metal-containing salicylic acid-based compound, a metal-containing naphthoic acid-based compound, a quaternary ammonium salt, a calixarene, a silicon compound, a non-metal carboxylic acid-based compound and derivatives thereof, and a sulfonic acid resin having a sulfonic acid group, a sulfonic acid salt group, or a sulfonic acid ester group.

Specific examples of the charge control agent include the following charge control agents for negative charging:

a metal compound of an aromatic carboxylic acid typified by salicylic acid, an alkylsalicylic acid, a dialkylsalicylic acid, naphthoic acid, and a dicarboxylic acid; a polymer or a copolymer having a sulfonic acid group, a sulfonic acid salt group, or a sulfonic acid ester group; a metal salt or metal complex of an azo dye or an azo pigment; and a boron compound, a silicon compound, and a calixarene.

Meanwhile, specific examples of the charge control agent include the following charge control agents for positive charging:

a quaternary ammonium salt and a polymer-type compound having a quaternary ammonium salt in a side chain; a guanidine compound; a nigrosine compound; and an imidazole compound.

Of those, a charge control agent for negative charging is often used.

In addition, examples of the polymer or copolymer having a sulfonic acid group, a sulfonic acid salt group, or a sulfonic acid ester group include a homopolymer of a sulfonic acid group-containing vinyl-based monomer typified by styrenesulfonic acid, 2-acrylamido-2-methylpropanesulfonic acid, 2-methacrylamido-2-methylpropanesulfonic acid, vinylsulfonic acid, and methacrylsulfonic acid, and a copolymer of any other vinyl-based monomer and the sulfonic acid group-containing vinyl-based monomer.

The content of the charge control agent is preferably 0.01 part by mass to 20.0 parts by mass, more preferably 0.1 part by mass to 10.0 parts by mass with respect to 100.0 parts by mass of the binder resin or the polymerizable monomers for producing the binder resin.

In the toner, from the viewpoint of an improvement in image quality, it is preferred that the toner particles each have an external additive added thereto.

Examples of the external additive include inorganic fine particles, such as silica fine particles, titanium oxide fine particles, and aluminum oxide fine particles.

The inorganic fine particles are preferably subjected to hydrophobizing treatment with a hydrophobizing agent, such as a silane coupling agent, a silicone oil, or a mixture thereof.

The content of the external additive is preferably 0.1 part by mass to 5.0 parts by mass, more preferably 0.1 part by mass to 3.0 parts by mass with respect to 100.0 parts by mass of the toner particles.

Calculation methods and measurement methods for various physical property values specified in the present disclosure are described below.

<Measurement Method for Volume-Average Median Diameter (Dv50) and Number-average Median Diameter (Dn50)>

The volume-average median diameter (Dv50) and number-average median diameter (Dn50) of the toner particles are calculated as described below. A precision particle size distribution measuring apparatus based on a pore electrical resistance method with a 100-micrometer aperture tube "Coulter Counter Multisizer 3" (trademark) (manufactured by Beckman Coulter Corporation) is used as a measuring apparatus. Dedicated software included therewith "Beckman Coulter Multisizer 3 Version 3.51" (manufactured by Beckman Coulter Corporation) is used for setting measurement conditions and analyzing measurement data. The measurement is performed with the number of effective measurement channels of 25,000.

An electrolyte aqueous solution prepared by dissolving reagent grade sodium chloride in ion-exchanged water so as to have a concentration of about 1% by mass, for example, "ISOTON II" (manufactured by Beckman Coulter Corporation) may be used in the measurement.

The dedicated software was set as described below prior to the measurement and the analysis.

In the "Change Standard Operating Method (SOMME)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter Corporation) is set as a Kd value. A threshold and a noise level are automatically set by pressing a "Measure Threshold/Noise Level" button. In addition, a current is set to 1,600 μA, a gain is set to 2, and an electrolyte solution is set to ISOTON II, and a check mark is placed in a check box "Flush Aperture Tube after Each Measurement."

In the "Convert Pulses to Particle Size Settings" screen of the dedicated software, a bin spacing is set to a logarithmic particle diameter, the number of particle diameter bins is set to 256, and a particle diameter range is set to the range of from 2 μm to 60 μm.

A specific measurement method is as described below.

(1) About 200 ml of the electrolyte aqueous solution is charged into a 250-milliliter round-bottom beaker made of glass dedicated for Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "Flush Aperture" function of the dedicated software.

(2) About 30 ml of the electrolyte aqueous solution is charged into a 100-milliliter flat-bottom beaker made of glass. About 0.3 ml of a diluted solution prepared by diluting "Contaminon N" (10% by mass aqueous solution of a neutral detergent for washing a precision measuring device formed of a nonionic surfactant, an anionic surfactant, and an organic builder and having a pH of 7, manufactured by Wako Pure Chemical Industries, Ltd.) with ion-exchanged water by about three parts by mass fold is added as a dispersant to the electrolyte aqueous solution.

(3) An ultrasonic dispersing unit "Ultrasonic Dispersion System Tetra 150" (manufactured by Nikkaki Bios Corporation) in which two oscillators each having an oscillatory frequency of 50 kHz are built so as to be out of phase by 180° and which has an electrical output of 120 W is prepared. About 3.3 l of ion-exchanged water is charged into the water tank of the ultrasonic dispersing unit. About 2.0 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted in order that the liquid level of the electrolyte aqueous solution in the beaker may resonate with an ultrasonic wave from the ultrasonic dispersing unit to the fullest extent possible.

(5) About 10 mg of the toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted so as to be 10 to 40° C. upon ultrasonic dispersion.

(6) The electrolyte aqueous solution in the section (5) in which the toner has been dispersed is dropped with a pipette to the round-bottom beaker in the section (1) placed in the sample stand, and the concentration of the toner particles to be measured is adjusted to about 5% by mass. Then, measurement is performed until the particle diameters of 50,000 particles are measured.

(7) The measurement data is analyzed with the dedicated software included with the apparatus, and the volume-average median diameter (Dv50) and the number-average median diameter (Dn50) are calculated.

<Measurement of Water Content>

A water content is a value obtained as follows: 5 g of wet toner particles are collected in an aluminum dish, and the whole is precisely weighed (A [g]), left at rest in a dryer set to a temperature of 105° C. for 1 hour, cooled, and then precisely weighed (B [g]), followed by calculation by the following equation.

Water content [mass %]=$((A-B)/A)\times 100$

<Measurement of Glass Transition Temperature (Tg) of Toner Particles>

A glass transition temperature (Tg) was measured using a differential scanning calorimeter "Q1000" (manufactured by TA Instruments Corporation) in conformity with ASTM D3418-82. The melting points of indium and zinc were used for the temperature correction of the detecting portion of the apparatus, and the heat of fusion of indium was used for the correction of a quantity of heat. Specifically, about 3 mg of the toner particles were precisely weighed and loaded into a pan made of aluminum, and measurement was performed using an empty pan made of aluminum as a reference in the measuring range of from 30 to 200° C. at a rate of temperature increase of 10° C./min. In this temperature increase process, a change in specific heat was obtained in the temperature range of from 40 to 100° C. A straight line obtained by extending the baseline before the appearance of the change in specific heat was defined as a first straight line, a straight line obtained by extending the baseline after the appearance of the change in specific heat was defined as a second straight line, and a straight line at equal distances from the first straight line and the second straight line in a vertical axis direction was defined as a third straight line. The temperature at the point of intersection of the third straight line and the stepwise change portion of a differential thermal curve (so-called midpoint glass transition temperature) was defined as the glass transition temperature Tg of the toner particles.

<Wettability Measurement>

The wettability, i.e., hydrophobic characteristic of the toner particles was determined from a methanol dropping transmittance curve obtained as described below.

First, 60 mL of RO (Reverse Osmosis) water was placed in a cylindrical glass container having a diameter of 5 cm and a thickness of 1.75 mm, and dispersion was performed with an ultrasonic disperser for 5 minutes in order to remove bubbles and the like in the measurement sample.

Subsequently, the toner particles were sieved with a mesh having an aperture of 150 µm, and 0.1 g of the toner that had passed through the mesh was precisely weighed and added into the container having the RO water placed therein to prepare a measurement sample liquid.

Then, the measurement sample liquid was set in a powder wettability tester "WET-100P" (manufactured by Rhesca Co., Ltd.). The measurement sample liquid was stirred using a magnetic stirrer at a speed of 5.0 s$^{-1}$ (300 rpm). A fluorine resin-coated spindle rotor having a length of 20 mm and a maximum middle diameter of 5 mm was used as the rotor of the magnetic stirrer.

Figure 13:
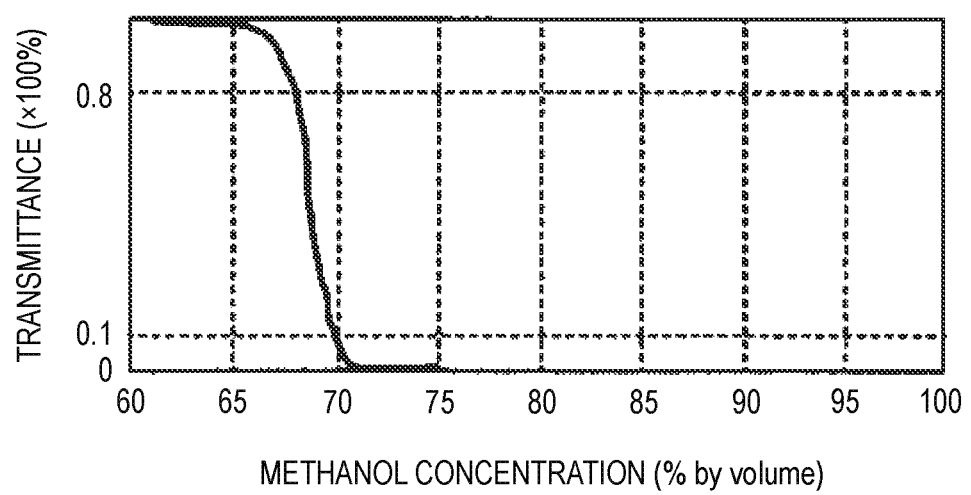
FIG. 13 is a graph showing transmittance for light having a wavelength of 780 nm versus methanol concentration.

Next, while methanol was continuously added into the measurement sample liquid through the above-mentioned apparatus at a dropping rate of 0.8 mL/min, a transmittance was measured with light having a wavelength of 780 nm to prepare such a methanol dropping transmittance curve as shown in FIG. 13. The concentration (% by volume) of methanol at a transmittance of 50% on the methanol dropping transmittance curve was defined as a methanol wettability half value.

When the methanol wettability half value is large, it is suggested that large amounts of a hydrophobic substance are present on the surfaces of the toner particles. Particularly when the methanol wettability half value is increased owing to a difference in, for example, conditions of the drying step, it is suggested that a hydrophobic substance such as a release agent has emerged on the surfaces of the toner particles. In such case, the charging performance of the toner particles may be reduced to reduce developability as a toner.

EXAMPLES

The present disclosure is more specifically described by way of Examples described below. The method of producing toner particles is described below. All of the terms "part(s)" in Examples and in Comparative Examples are on a mass basis unless otherwise stated.

<Production of Wet Toner Particles A>

Wet toner particles A were produced by the following procedure.

(Pigment-Dispersed Composition-Preparing Step)

Styrene 25.0 parts was mixed with 1.85 parts of C.I. Pigment Red 155 and 2.32 parts of C.I. Pigment Red 122. Further, 0.324 part of a charge control agent (BONTRON E88; manufactured by Orient Chemical Industries Co., Ltd.), 0.02 part of an aluminum salicylate compound, and 0.56 part of a sulfonic acid group-containing resin (Acrybase FCA-1001-NS, manufactured by Fujikura Kasei Co., Ltd.) were prepared. Those materials were introduced into an attritor (manufactured by Nippon Coke & Engineering Co., Ltd.), and stirred using zirconia beads each having a radius of 5.00 mm at 200 rpm and 25° C. for 300 minutes to prepare a pigment-dispersed composition.

(Polymerizable Monomer Composition-Preparing Step)

The following materials were loaded into the same container, and the contents were mixed and dispersed using T.K. Homomixer (manufactured by Tokushu Kika Kogyo Co., Ltd.) at a peripheral speed of 20 m/s.

| | |
|---|---|
| Pigment-dispersed composition | 26.27 parts |
| Styrene | 9.43 parts |
| n-Butyl acrylate | 10.43 parts |
| Polyester resin | 2.09 parts |
| Styrene-methacrylic acid-methyl methacrylate-α-methylstyrene copolymer | 5.42 parts |

(styrene/methacrylic acid/methyl methacrylate/α-methylstyrene = 80.85/2.50/1.65/15.0, Mp = 19,700, Mw = 7,900, Tg = 96° C., acid value = 12.0 mgKOH/g, Mw/Mn = 2.1)

Further, the resultant was warmed to 60° C., and then 4.17 parts of a microcrystalline wax (Hi-Mic-2065; manufactured by Nippon Seiro Co., Ltd.) was fed as a release agent. The contents were dispersed and mixed for 30 minutes, and 3.75 parts of a polymerization initiator 2,2'-azobis(2,4-dimethylvaleronitrile) was dissolved therein to prepare a colorant-containing polymerizable monomer composition.

(Aqueous Dispersion Medium-Preparing Step)

Ion-exchanged water 117.29 parts, 2.12 parts of sodium phosphate dodecahydrate, and 0.88 part of 10% hydrochloric acid were added to a granulation tank to produce an aqueous solution of sodium phosphate, which was warmed to 60° C. Calcium chloride dihydrate 1.23 parts was dissolved in 9.62 parts of ion-exchanged water to provide an aqueous solution of calcium chloride. The aqueous solution of calcium chloride was added to the above-mentioned aqueous solution of sodium phosphate, and the mixture was stirred using CLEARMIX (manufactured by M Technique Co., Ltd.) at a peripheral speed of 25 m/s for 30 minutes to prepare an aqueous dispersion medium formed of a poorly water-soluble inorganic fine particle dispersion liquid.

(Granulation Step)

The monomer composition was charged into the aqueous dispersion medium, and the mixture was stirred at a temperature of 60° C. under a nitrogen atmosphere with CLEARMIX (manufactured by M Technique Co., Ltd.) at a peripheral speed of 25 m/s for 20 minutes to provide a dispersion liquid of the monomer composition.

(Reaction Step)

The dispersion liquid of the monomer composition was transferred to another tank, and while being stirred with a paddle stirring blade, was increased in temperature to a temperature of 78° C. and subjected to a reaction for 4 hours to produce toner particles. After that, the temperature was further increased to 90° C., and a reaction was performed for 2 hours to provide a dispersion liquid of toner particles that had undergone the removal of organic volatile substances.

(Washing/Filtration Step)

After the dispersion liquid of the toner particles had been cooled, hydrochloric acid was added to adjust its pH to 1.2, and the resultant was stirred for 1 hour. After that, the dispersion liquid of the toner particles was separated by filtration, followed by water washing/filtration with water in an amount equal to that of the filtrate to provide the wet toner particles A. The wet toner particles A had a volume-average median diameter (Dv50) of 6.72 μm and a water content of 26.8% by mass.

(Preparation of Tg Measurement Sample of Toner Particles)

The resultant wet toner particles A were subjected to air drying in a thermostat at 35° C. for 4 days to provide toner particles for Tg measurement. The Tg of the resultant toner particles was 56° C.

Example 1

Drying of the wet toner particles A was performed using the loop-type flash dryer illustrated in FIG. 1. The angle of a blowing pipe was adjusted so that the velocity component ratio K became 100%. The relationship between the cross-sectional area A ($mm^2$) of the drying pipe and the area B ($mm^2$) of the first blowing port was set to B/A=0.50. An adjustment was made so that the total gas flow rate F (L/sec) of the gases blown into the drying pipe and the gas flow rate S (L/sec) of the gas supplied through the first blowing port had a relationship S/F of 0.80. In addition, an adjustment was made so that the total gas flow rate F (L/sec) of the gases blown into the drying pipe and the gas flow rate V (L/sec) of the gas discharged through the discharge port had a relationship V/F of 1.10. The temperatures of the gases supplied through the first blowing port and the second blowing ports were both adjusted to 75° C. Operation conditions including, in addition to those described above, a discharge temperature, the total gas flow rate F, and the supply amount of the wet toner particles A are shown in Table 1.

The water content and methanol wettability half value of the resultant toner particles are shown in Table 2. Their respective evaluation ranks in Table 2 are as described below.

Water Content (mass %) of Toner Particles
 A (Excellent): less than 0.5
 B (Satisfactory): 0.5 or more and less than 1.0
 C (Acceptable): 1.0 or more and less than 1.5
 D (Not acceptable): 1.5% or more
Methanol Wettability Half Value (% by Volume)
 A (Excellent): less than 15.0
 B (Satisfactory): 15.0 or more and less than 18.0
 C (Acceptable): 18.0 or more and less than 21.0
 D (Not acceptable): 21.0 or more Example 2

Figure 4:
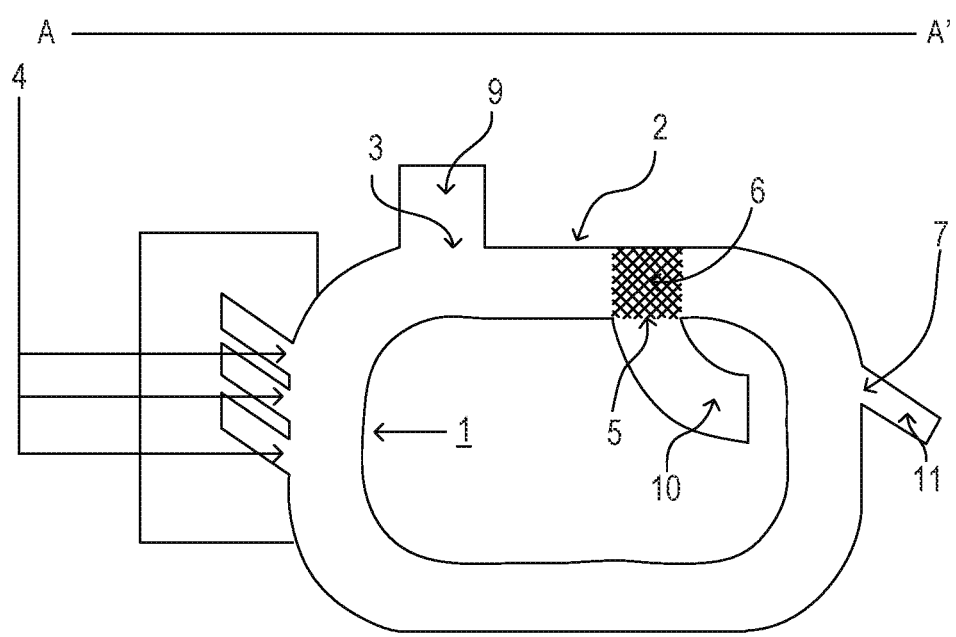
FIG. 4 is a schematic view for illustrating an example of a loop-type flash dryer that may be applied to the drying step of the present disclosure.

A drying step was performed under the same conditions and by the same method as in Example 1 except for using a loop-type flash dryer illustrated in FIG. 4 in which the mounting position of the first blowing port was changed with respect to the apparatus of FIG. 1. The operation conditions of the drying step are shown in Table 1.

The water content and methanol wettability half value of the resultant toner particles are shown in Table 2.

Examples 3 to 6

A drying step was performed under the same conditions and by the same method as in Example 1 except that: the port diameter of the first blowing port was changed; and the relationship between the cross-sectional area A ($m^2$) of the drying pipe and the area B ($m^2$) of the first blowing port was changed. The operation conditions of the drying step according to each of Examples 3 to 6 are shown in Table 1.

The water content and methanol wettability half value of the resultant toner particles are shown in Table 2.

Examples 7 to 11

A drying step was performed under the same conditions and by the same method as in Example 1 except that the gas flow rate S (L/sec) of the first blowing port relative to the total gas flow rate F (L/sec) was changed. The operation conditions of the drying step according to each of Examples 7 to 11 are shown in Table 1.

The water content and methanol wettability half value of the resultant toner particles are shown in Table 2.

Examples 12 to 15

A drying step was performed under the same conditions and by the same method as in Example 1 except that the relationship between the gas flow rate F (L/sec) of the gases supplied to the drying pipe and the gas flow rate V (L/sec) of the gas discharged through the discharge port was changed. The operation conditions of the drying step according to each of Examples 12 to 15 are shown in Table 1.

The water content and methanol wettability half value of the resultant toner particles are shown in Table 2.

Example 16

A drying step was performed under the same conditions and by the same method as in Example 1 except that the gas flow rate S (L/sec) of the first blowing port relative to the total gas flow rate F (L/sec) was changed. The operation conditions of the drying step are shown in Table 1.

The water content and methanol wettability half value of the resultant toner particles are shown in Table 2.

Examples 17 to 23

A drying step was performed under the same conditions and by the same method as in Example 16 except that the temperature of the gas supplied through the first blowing port was changed. The operation conditions of the drying step according to each of Examples 17 to 23 are shown in Table 1.

The water content and methanol wettability half value of the resultant toner particles are shown in Table 2.

Example 24

Figure 7:
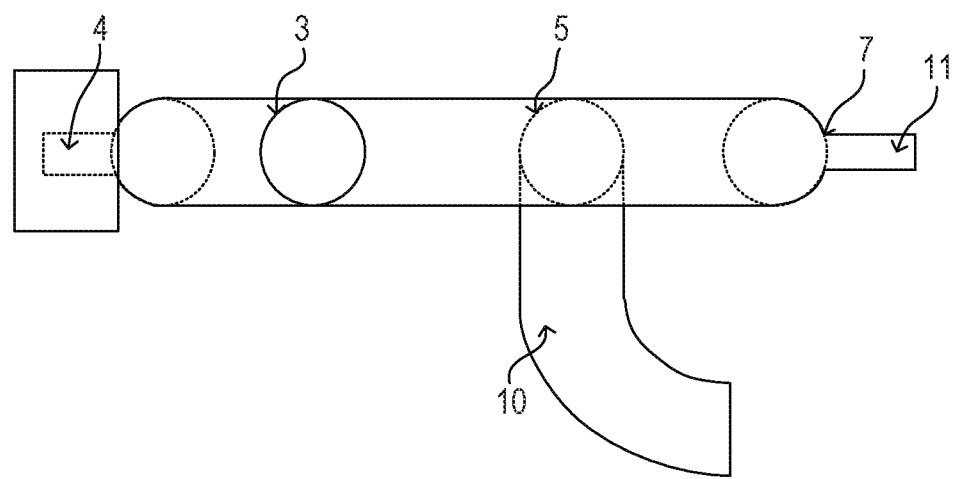
FIG. 7 is a schematic view for illustrating the loop-type flash dryer of FIG. 5 as seen from the line A-A'.

A drying step was performed under the same conditions and by the same method as in Example 1 except for using a loop-type flash dryer illustrated in FIG. 5 in which the mounting position of the first blowing port was set to the outermost periphery of the drying pipe illustrated in FIG. 7. The operation conditions of the drying step are shown in Table 1.

The water content and methanol wettability half value of the resultant toner particles are shown in Table 2.

Examples 25 to 28

Figure 12:
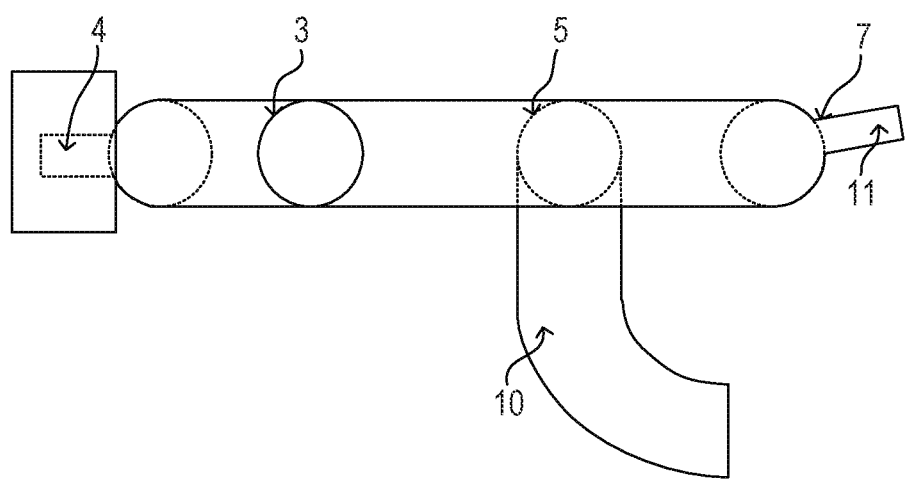
FIG. 12 is a schematic view for illustrating a change in a mounting position of the first blowing port in a loop-type flash dryer used in Examples 24 to 28 as compared to the loop-type flash dryer of FIG. 5.

A drying step was performed under the same conditions and by the same method as in Example 24 except for using a loop-type flash dryer illustrated in FIG. 5 in which the mounting position of the first blowing port was adjusted in a horizontal direction as illustrated in FIG. 12. The operation conditions of the drying step according to each of Examples 25 to 28 are shown in Table 1.

The water content and methanol wettability half value of the resultant toner particles are shown in Table 2.

Examples 29 to 31

A drying step was performed under the same conditions and by the same method as in Example 24 except for using a loop-type flash dryer illustrated in FIG. 6 in which the angle R illustrated in FIG. 6 and formed between the velocity component "b" of the gas blown through the first blowing port and the circulation direction "a" in the discharge region was set to 15° (Example 29), 30° (Example 30), or 45° (Example 31), respectively. The operation conditions of the drying step according to each of Examples 29 to 31 are shown in Table 1.

The water content and methanol wettability half value of the resultant toner particles are shown in Table 2.

Examples 32 to 34

A drying step was performed under the same conditions and by the same method as in Example 2 except for using a loop-type flash dryer illustrated in FIG. 4 in which the mounting position of the first blowing port was adjusted in a vertical direction so that the velocity component ratio K was 50% (Example 32), 20% (Example 33), or 10% (Example 34), respectively. The operation conditions of the drying step according to each of Examples 32 to 34 are shown in Table 1.

The water content and methanol wettability half value of the resultant toner particles are shown in Table 2.

Comparative Example 1

A drying step for the wet toner particles A was performed using a loop-type flash dryer illustrated in FIG. 3 that was not provided with the first blowing port. The operation conditions of the drying step are shown in Table 1.

The water content and methanol wettability half value of the resultant toner particles are shown in Table 2.

Comparative Example 2

A drying step was performed under the same conditions and by the same method as in Comparative Example 1 except that the supply amount of the wet toner particles A was reduced to 45 kg/hr. The operation conditions of the drying step are shown in Table 1.

The water content and methanol wettability half value of the resultant toner particles are shown in Table 2.

Comparative Example 3

A drying step was performed under the same conditions and by the same method as in Comparative Example 1 except that the supply gas temperature of the second blowing ports was changed. Consequently, the discharge temperature reduced to 37° C. The operation conditions of the drying step are shown in Table 1.

The water content and methanol wettability half value of the resultant toner particles are shown in Table 2.

Comparative Example 4

Figure 8:
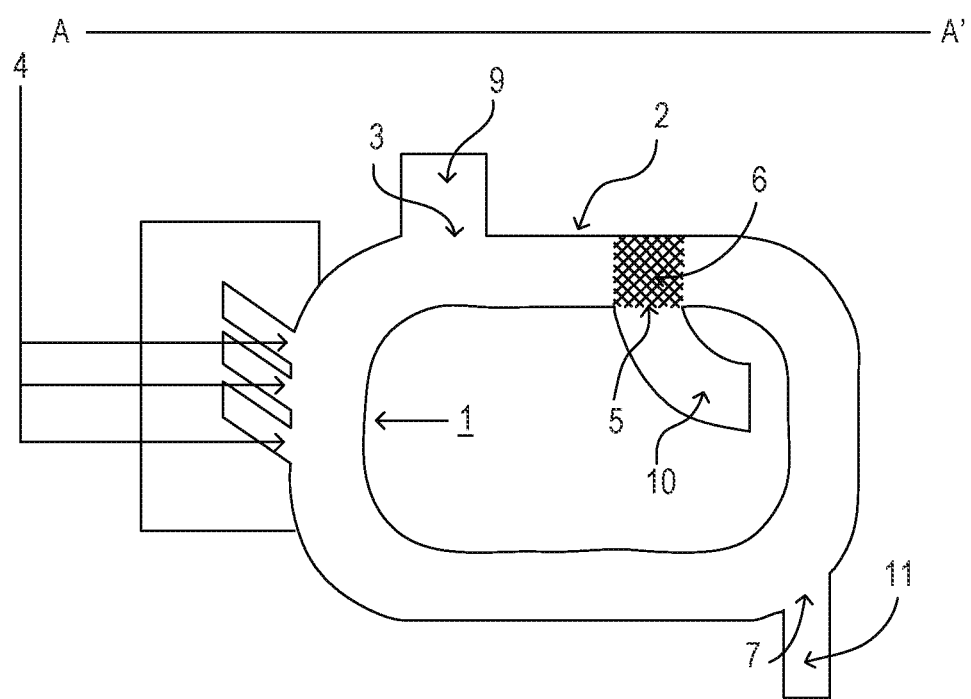
FIG. 8 is a schematic view of a loop-type flash dryer used in Comparative Example 4.

A drying step was performed under the same conditions and by the same method as in Example 1 except for using a loop-type flash dryer illustrated in FIG. 8. The operation conditions of the drying step are shown in Table 1.

The water content and methanol wettability half value of the resultant toner particles are shown in Table 2.

Comparative Example 5

Figure 9:
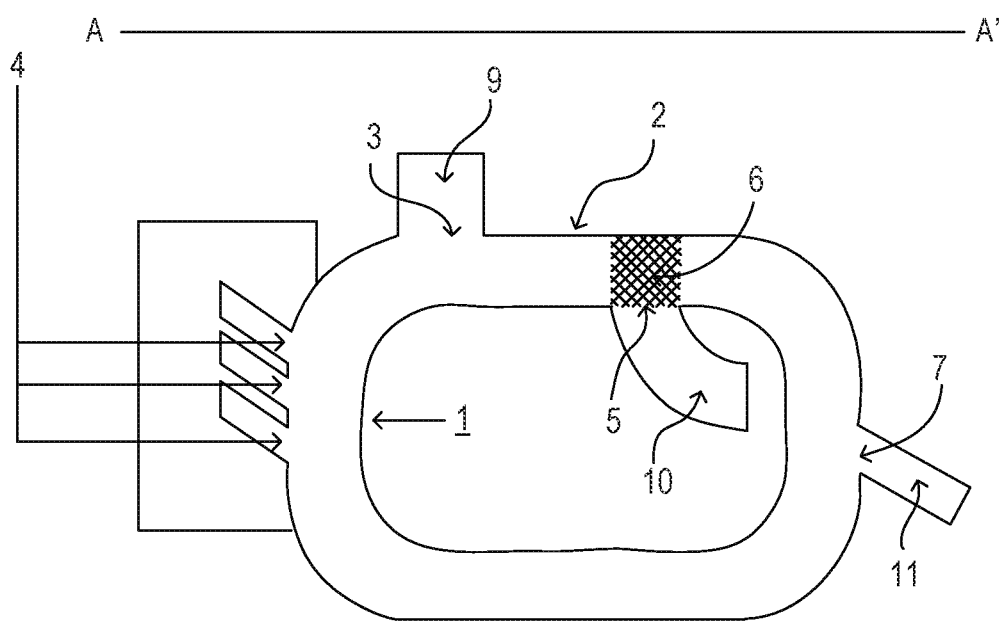
FIG. 9 is a schematic view of a loop-type flash dryer used in Comparative Example 5.

A drying step was performed under the same conditions and by the same method as in Example 2 except for using a loop-type flash dryer illustrated in FIG. 9 in which the velocity component ratio K was set to 0% by adjusting the mounting position of the first blowing port. The operation conditions of the drying step are shown in Table 1.

The water content and methanol wettability half value of the resultant toner particles are shown in Table 2.

Comparative Example 6

Figure 10:
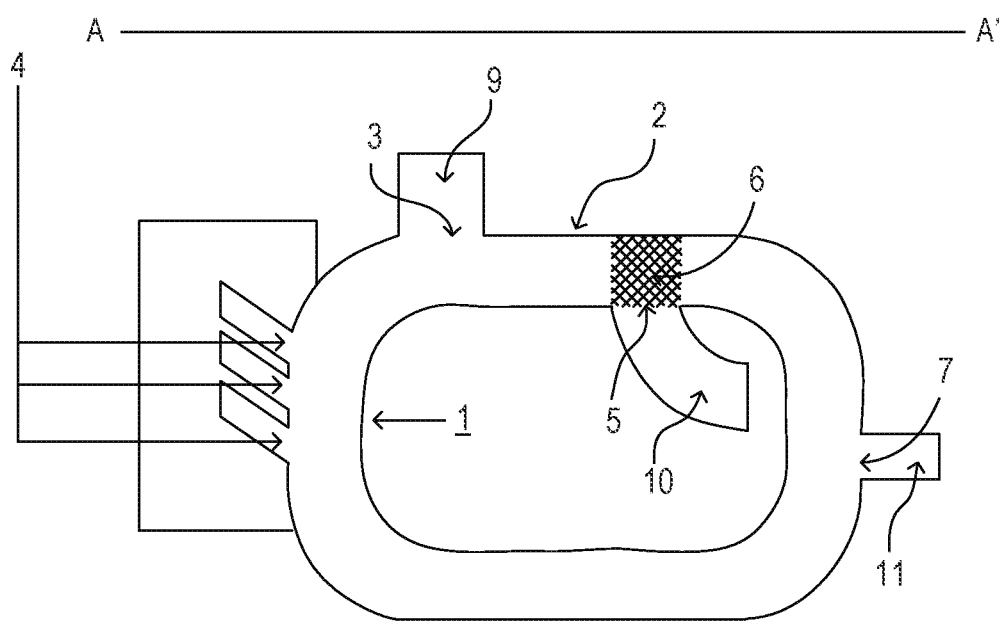
FIG. 10 is a schematic view of a loop-type flash dryer used in Comparative Example 6.

A drying step was performed under the same conditions and by the same method as in Example 1 except for using a loop-type flash dryer illustrated in FIG. 10. The mounting position of the first blowing port was set to be the same as in FIG. 9, and the velocity component of the gas blown through the first blowing port was set to be horizontal. The operation conditions of the drying step are shown in Table 1.

The water content and methanol wettability half value of the resultant toner particles are shown in Table 2.

TABLE 1

| | Apparatus shape | Area B/Cross-sectional area A | Gas flow rate S/Total gas flow rate F | Gas flow rate V/Total gas flow rate F | Supply gas temperature of first blowing port (° C.) | Velocity component ratio K (%) | Supply gas temperature of second blowing ports (° C.) | Discharge temperature (° C.) | Total gas flow rate F (L/sec) |
|---|---|---|---|---|---|---|---|---|---|
| Example 1 | FIG. 1 | 0.50 | 0.80 | 1.10 | 75.0 | 100 | 75 | 40 | 180 |
| Example 2 | FIG. 4 | 0.50 | 0.80 | 1.10 | 75.0 | 100 | 75 | 40 | 180 |
| Example 3 | FIG. 1 | 0.05 | 0.80 | 1.10 | 75.0 | 100 | 75 | 40 | 180 |
| Example 4 | FIG. 1 | 0.10 | 0.80 | 1.10 | 75.0 | 100 | 75 | 40 | 180 |
| Example 5 | FIG. 1 | 0.60 | 0.80 | 1.10 | 75.0 | 100 | 75 | 40 | 180 |
| Example 6 | FIG. 1 | 0.70 | 0.80 | 1.10 | 75.0 | 100 | 75 | 40 | 180 |
| Example 7 | FIG. 1 | 0.50 | 0.90 | 1.10 | 75.0 | 100 | 75 | 40 | 180 |
| Example 8 | FIG. 1 | 0.50 | 0.85 | 1.10 | 75.0 | 100 | 75 | 40 | 180 |
| Example 9 | FIG. 1 | 0.50 | 0.20 | 1.10 | 75.0 | 100 | 75 | 40 | 180 |
| Example 10 | FIG. 1 | 0.50 | 0.10 | 1.10 | 75.0 | 100 | 75 | 40 | 180 |
| Example 11 | FIG. 1 | 0.50 | 0.05 | 1.10 | 75.0 | 100 | 75 | 40 | 180 |
| Example 12 | FIG. 1 | 0.50 | 0.80 | 0.90 | 75.0 | 100 | 75 | 40 | 180 |
| Example 13 | FIG. 1 | 0.50 | 0.80 | 1.00 | 75.0 | 100 | 75 | 40 | 180 |
| Example 14 | FIG. 1 | 0.50 | 0.80 | 1.30 | 75.0 | 100 | 75 | 40 | 180 |
| Example 15 | FIG. 1 | 0.50 | 0.80 | 1.40 | 75.0 | 100 | 75 | 40 | 180 |
| Example 16 | FIG. 1 | 0.50 | 0.50 | 1.10 | 75.0 | 100 | 75 | 40 | 180 |
| Example 17 | FIG. 1 | 0.50 | 0.50 | 1.10 | 90.0 | 100 | 75 | 44 | 180 |
| Example 18 | FIG. 1 | 0.50 | 0.50 | 1.10 | 80.0 | 100 | 75 | 41 | 180 |
| Example 19 | FIG. 1 | 0.50 | 0.50 | 1.10 | 66.0 | 100 | 75 | 38 | 180 |
| Example 20 | FIG. 1 | 0.50 | 0.50 | 1.10 | 58.0 | 100 | 75 | 35 | 180 |
| Example 21 | FIG. 1 | 0.50 | 0.50 | 1.10 | 40.0 | 100 | 75 | 32 | 180 |
| Example 22 | FIG. 1 | 0.50 | 0.50 | 1.10 | 30.0 | 100 | 75 | 30 | 180 |
| Example 23 | FIG. 1 | 0.50 | 0.50 | 1.10 | 20.0 | 100 | 75 | 27 | 180 |
| Example 24 | FIG. 5, FIG. 7 | 0.50 | 0.80 | 1.10 | 75.0 | 100 | 75 | 40 | 180 |
| Example 25 | FIG. 5, FIG. 12 | 0.50 | 0.80 | 1.10 | 75.0 | 100 | 75 | 40 | 180 |
| Example 26 | FIG. 5, FIG. 12 | 0.50 | 0.80 | 1.10 | 75.0 | 50 | 75 | 40 | 180 |
| Example 27 | FIG. 5, FIG. 12 | 0.50 | 0.80 | 1.10 | 75.0 | 20 | 75 | 40 | 180 |
| Example 28 | FIG. 5, FIG. 12 | 0.50 | 0.80 | 1.10 | 75.0 | 10 | 75 | 40 | 180 |
| Example 29 | FIG. 6 | 0.50 | 0.80 | 1.10 | 75.0 | 100 | 75 | 40 | 180 |
| Example 30 | FIG. 6 | 0.50 | 0.80 | 1.10 | 75.0 | 100 | 75 | 40 | 180 |
| Example 31 | FIG. 6 | 0.50 | 0.80 | 1.10 | 75.0 | 50 | 75 | 40 | 180 |
| Example 32 | FIG. 4 | 0.50 | 0.80 | 1.10 | 75.0 | 50 | 75 | 40 | 180 |
| Example 33 | FIG. 4 | 0.50 | 0.80 | 1.10 | 75.0 | 20 | 75 | 40 | 180 |
| Example 34 | FIG. 4 | 0.50 | 0.80 | 1.10 | 75.0 | 10 | 75 | 40 | 180 |
| Comparative Example 1 | FIG. 3 | — | — | 1.10 | — | — | 75 | 40 | 180 |
| Comparative Example 2 | FIG. 3 | — | — | 1.10 | — | — | 75 | 40 | 120 |
| Comparative Example 3 | FIG. 3 | — | — | 1.10 | — | — | 66 | 37 | 180 |
| Comparative Example 4 | FIG. 8 | 0.50 | 0.80 | 1.10 | 75.0 | 0 | 75 | 40 | 180 |
| Comparative Example 5 | FIG. 9 | 0.50 | 0.80 | 1.10 | 75.0 | 0 | 75 | 40 | 180 |
| Comparative Example 6 | FIG. 10 | 0.50 | 0.80 | 1.10 | 75.0 | 0 | 75 | 40 | 180 |

TABLE 2

| | Supply amount of wet toner particles A (kg/hr) | Water content of toner particles % by mass | Water content of toner particles Rank | Methanol wettability half value % by volume | Methanol wettability half value Rank |
|---|---|---|---|---|---|
| Example 1 | 73 | 0.2 | A | 13.3 | A |
| Example 2 | 73 | 0.5 | B | 15.7 | B |
| Example 3 | 73 | 0.7 | B | 18.7 | C |
| Example 4 | 73 | 0.5 | B | 17.1 | B |
| Example 5 | 73 | 0.3 | A | 14.8 | A |
| Example 6 | 73 | 0.6 | B | 14.0 | A |
| Example 7 | 73 | 0.1 | A | 19.4 | C |
| Example 8 | 73 | 0.4 | A | 15.2 | B |
| Example 9 | 73 | 0.4 | A | 16.7 | B |
| Example 10 | 73 | 0.6 | B | 18.8 | C |
| Example 11 | 73 | 0.8 | B | 19.4 | C |
| Example 12 | 73 | 0.6 | B | 14.0 | A |
| Example 13 | 73 | 0.2 | A | 14.1 | A |
| Example 14 | 73 | 0.5 | B | 16.6 | B |
| Example 15 | 73 | 0.9 | B | 19.7 | C |
| Example 16 | 73 | 0.4 | A | 15.7 | B |
| Example 17 | 73 | 0.4 | A | 18.4 | C |
| Example 18 | 73 | 0.4 | A | 16.5 | B |
| Example 19 | 73 | 0.4 | A | 15.0 | B |
| Example 20 | 73 | 0.6 | B | 14.3 | A |
| Example 21 | 73 | 0.7 | B | 14.4 | A |
| Example 22 | 73 | 0.9 | B | 14.3 | A |
| Example 23 | 73 | 1.2 | C | 14.2 | A |
| Example 24 | 73 | 0.2 | A | 13.8 | A |
| Example 25 | 73 | 0.2 | A | 13.8 | A |
| Example 26 | 73 | 0.3 | A | 15.0 | B |
| Example 27 | 73 | 0.4 | A | 15.8 | B |
| Example 28 | 73 | 0.6 | B | 17.7 | B |

TABLE 2-continued

|  | Supply amount of wet toner particles A (kg/hr) | Water content of toner particles % by mass | Rank | Methanol wettability half value % by volume | Rank |
|---|---|---|---|---|---|
| Example 29 | 73 | 0.3 | A | 14.2 | A |
| Example 30 | 73 | 0.6 | B | 14.8 | A |
| Example 31 | 73 | 0.8 | B | 14.9 | A |
| Example 32 | 73 | 0.7 | B | 16.6 | B |
| Example 33 | 73 | 0.6 | B | 17.8 | B |
| Example 34 | 73 | 0.8 | B | 19.1 | C |
| Comparative Example 1 | 73 | 1.3 | C | 32.9 | D |
| Comparative Example 2 | 45 | 0.8 | B | 27.3 | D |
| Comparative Example 3 | 45 | 0.7 | B | 22.2 | D |
| Comparative Example 4 | 73 | 1.7 | D | 18.6 | C |
| Comparative Example 5 | 73 | 1.5 | D | 17.1 | C |
| Comparative Example 6 | 73 | 2.3 | D | 19.9 | C |

According to the present disclosure, the loop-type flash drying apparatus capable of drying an object to be treated without reducing treatment capacity and without applying an excessive quantity of heat to the object can be provided. Further, resin particles and toner particles can be obtained with little adverse influence of heat due to drying.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126531, filed Aug. 2, 2021, which is hereby incorporated by reference herein in its entirety.

What is claimed is:

1. A loop-type flash drying apparatus configured to dry an object to be treated with a gas by supplying the object into a gas stream circulating in a loop-type drying pipe,
    wherein the loop-type flash drying apparatus comprises:
        (i) a loop-type drying pipe;
        (ii) a feeding port configured to feed the object to be treated into the drying pipe;
        (iii) a second blowing port configured to blow the gas into the drying pipe;
        (iv) a discharge port configured to discharge the object from the drying pipe;
        (v) a discharge region formed by the drying pipe and the discharge port; and
        (vi) a first blowing port through which an accelerating gas for accelerating the gas flowing in the discharge region is linearly blown toward the discharge region, and
    wherein a cross-sectional area A ($m^2$) of the drying pipe and an area B ($m^2$) of the first blowing port have a relationship of $0.10<B/A<0.60$.

2. The loop-type flash drying apparatus according to claim 1, wherein the first blowing port and the discharge port are arranged at positions connected by a straight line in the drying pipe.

* * * * *